April 7, 1964 B. C. EAVES 3,128,447
VEHICLE TIMED TURN SIGNAL APPARATUS
Filed July 24, 1961

INVENTOR.
BEECHER C. EAVES
BY
Donnelly, Meintag & Harrington
ATTORNEYS

United States Patent Office 3,128,447
Patented Apr. 7, 1964

3,128,447
VEHICLE TIMED TURN SIGNAL APPARATUS
Beecher C. Eaves, 1406 Edgewood Drive,
Royal Oak, Mich.
Filed July 24, 1961, Ser. No. 126,022
3 Claims. (Cl. 340—56)

This invention relates generally to a novel and improved electronic vehicle turn signalling apparatus, and, more particularly, to an electronic vehicle turn signalling apparatus which will automatically stop signalling after a predetermined time interval.

Accordingly, it is the primary object of the present invention to provide a novel and improved vehicle turn signalling apparatus which will provide a timed light signal that flashes alternately "on" and "off" on both the front and rear of the vehicle and on the left or right side thereof, depending on the position of the selector device, and which will be automatically de-energized after a predetermined time interval if the return means malfunctions, or the turn is too short to make the return means operate, and the driver does not manually return the signal to the neutral or inoperative position.

It is another object of the present invention to provide a flashing vehicle turn signal light which incorporates means for de-energizing the turn signal after a predetermined controlled timed interval, and which is simple and compact in construction, efficient in operation and economical of manufacture.

Other objects, features and advantages of this invention will be apparent from the following detailed description and appended claims.

In the drawing:

FIG. 1 is a diagrammatic illustration of a conventional or typical turn signal circuit for automobiles or the like;

Figure 1:
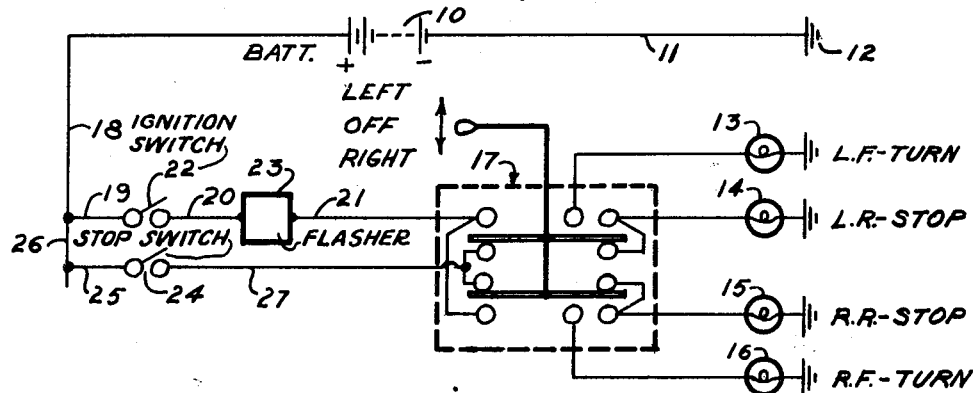
Figure 2:
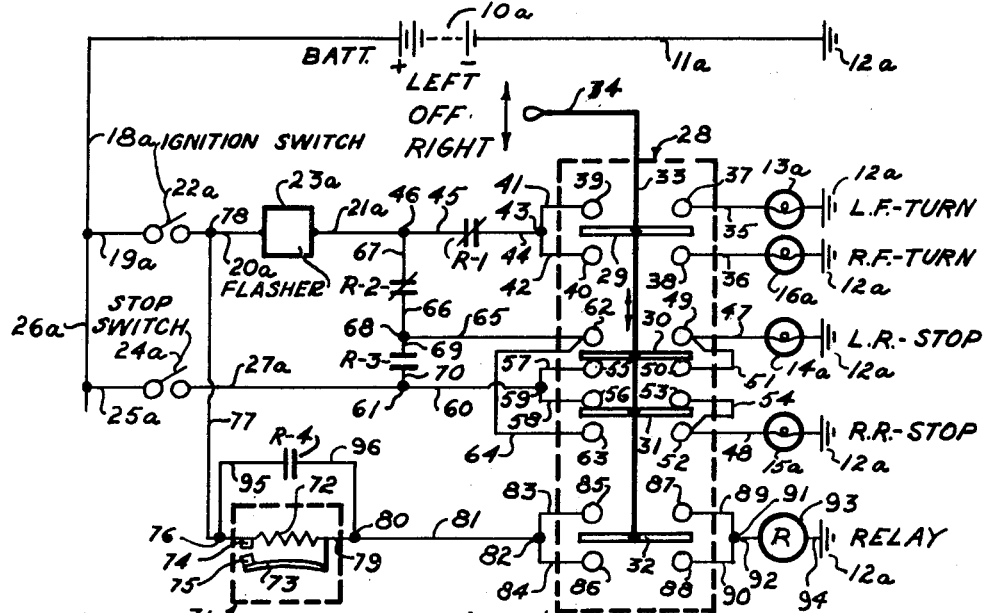
FIG. 2 is a diagrammatic illustration of a vehicle timed turn signal circuit made in accordance with the principles of the invention.

Referring now to the drawing and in particular to FIG. 1, this figure illustrates a typical vehicle turn signal and stop light circuit as used on most automobiles, trucks or like vehicles at the present time. The conventional turn signal circuit shown in FIG. 1 includes a battery source indicated by the numeral 10 and one terminal of the battery is connected by means of the lead 11 to the ground indicated by the numeral 12. The left and right turn lights indicated by the numerals 13, 14, 15 and 16 are connected by means of the selector switch generally indicated by the numeral 17 to the other terminal of the battery 10 by means of the leads 18, 19, 20, and 21 and the ignition switch 22 and the conventional flasher unit 23. The circuit of FIG. 1 is not described in detail since it is illustrated merely as a reference to show a conventional vehicle turn signal system and for comparing the same to the improved circuit of the present invention as illustrated in FIG. 2. It will be understood that the flasher unit 23 in the conventional circuit of FIG. 1 alternately raises and lowers the voltage across the left or right park and stop lights, as determined by the position of the turn signal switch generally indicated by the numeral 17. The variation of the voltage makes the appropriate lights blink "off" and "on." It will be seen that the two stop lights 14 and 15 in the conventional circuit of FIG. 1 may be operated when the turn signal switch 17 is in the neutral position as shown in FIG. 1 by merely operating the stop light switch 24 which is connected to the battery 10 by means of the leads 25, 26 and 18, and which is further connected to the switch means 17 by the lead 27. With the turn signal switch 17 moved to the left or right position, the particular stop light becomes the rear blinking turn signal and the other stop light will glow steadily when the stop switch is closed.

FIG. 2 illustrates the vehicle timed turn signal circuit made in accordance with the principles of the present invention. The elements of the circuit of FIG. 2 which are identical with the circuit of FIG. 1 are marked with the corresponding reference numerals followed by the small letter "a." It will be seen that in the improved circuit of FIG. 2, a novel turn signal switch generally indicated by the numeral 28 has been inserted between the turn signal lights 13a and 16a and the stop lights 14a and 15a, and the power leads 21a and 27a which are connected to the positive terminal battery 10a.

The turn signal switch 28 includes the four movable switch elements or blades which are indicated by the numerals 29, 30, 31 and 32, and which are spring retained or attached by any suitable spring means on the linkage bar 33. The switch element linkage bar 33 is fixedly connected by any suitable means to the usual turn signal indicator handle 34 by means of which the linkage bar 33 may be moved to the left, right and neutral positions. As shown in FIG. 2, the linkage bar 33 with its switch elements 29 through 32 is disposed in the neutral position.

As shown in FIG. 2, the left and right front turn signal lamps 13a and 16a, and the left and right stop lamps are grounded in usual manner to the vehicle frame, as indicated by the numerals 12a. The turn signal lamps 13a and 16a are connected by the lead wires 35 and 36 to the two laterally spaced apart contact terminals 37 and 38, respectively, on the one end of the switch 28. The switch 28 is provided with a mating pair of contact terminals 39 and 40 which are connected in parallel by means of the lead wires 41 and 42 to the terminal 43. It will be seen that when the switch linkage 33 is moved upwardly the switch element 29 will be engaged with the contact terminals 37 and 39 so as to complete a circuit therebetween, and when the switch linkage 33 is moved downwardly, the switch element 29 will complete a circuit through the contact terminals 38 and 40, as more fully explained hereinafter. As shown in FIG. 2, the terminal 43 is connected to the flasher lead wire 21a by means of the lead wire 44, the normally closed relay contact R-1, the lead wire 45 and the terminal 46.

The stop lamp 14a is connected by means of the lead wire 47 to the contact terminal 49. The terminal 49 is connected to the longitudinally spaced apart contact terminal 50 by means of the lead wire 51. The other stop light lamp 15a is connected by means of the lead wire 48 to the contact terminal 52 and this terminal is connected to the longitudinally spaced apart contact terminal 53 by means of the lead wire 54. When the switch linkage bar 33 is disposed in the neutral position as shown in FIG. 2, the stop light contact terminals 50 and 53 are connected or shorted by means of the switch elements 30 and 31 to the contact terminals 55 and 56, respectively. The contact terminals 55 and 56 are connected by means of the lead wires 57 and 58 to the terminal 59 and this terminal is connected by means of the lead wire 60 and the terminal 61 to the stop light switch lead wire 27a, whereby the stop lights may be operated in the usual manner when the stop light switch 24a is closed, and the switch 28 is in the neutral position, as shown in FIG. 2.

The following described structure permits one stop light to be used as a directional signal and the other stop light to be used in the normal fashion. When the turn signal linkage bar 33 is moved upwardly or downwardly, the stop light switch elements 30 and 31 will transmit current to one or the other of the stop light lamps 14a and 15a by means of engagement with the contact terminals 62 or 63. The contact terminals 62 and 63 are interconnected by means of the lead wire 64. The contact terminal 62 is connected to the power output lead wire 21a of the flasher 23a by means of the lead wires 65, 66 and 67 and the terminals 68 and 46 and the normally closed relay contact R–2. The lead wire 65 is connectable to the stop light power input lead wire 27a for reasons more fully described hereinafter by means of the lead wires 69 and 70, and the normally open relay contact R–3.

As shown in FIG. 2, the novel and improved turn signal system of the present invention includes a timed delay apparatus generally indicated by the numeral 71. The timed delay device 71 comprises the electrically operated heater element 72, the bi-metallic strip 73, and the set of normally open contacts 74 and 75. The contact 74 is connected to one end of the heater strip 72 and to the terminal 76. The terminal 76 is connected by means to the lead wire 77 to the terminal 78 in the flasher power input lead wire line 20a. The other timed delay contact is fixedly mounted in the usual manner on one end of the bi-metallic strip 73. The timed delay device 71 is of a conventional design and the fixed end of the bi-metallic strip 73 is connected to the other end of the heater element 72 and to the lead wire 79. The lead wire 79 is connected to the terminal 80 and this terminal is connected to the lead wire 81. The lead wire 81 is connected at its other end to the terminal 82 which is in turn connected by means of the lead wires 83 and 84 to the turn signal switch contact terminals 85 and 86. The turn signal switch further includes a second pair of contact terminals 87 and 88 which are connected by means of the lead wires 89 and 90 to the terminal 91. The terminal 91 is connected to one end of the coil of the relay 93 by means of the lead wire 92 and the other end of the relay coil is connected by means of the lead wire 94 to the ground 12a. The relay 93 is also indicated by R. The holding circuit comprising the lead wires 95 and 96 and the normally open relay contact R–4 is connected between the terminal 76 and 80 in parallel with the heater element 72.

The ohmic resistance of the heater element 72 is such that when it is connected in series with the coil of the relay 93, the voltage drop across the coil of the relay 93 is of insufficient magnitude to cause the relay to operate.

The operation of the various components of the novel and improved turn signal circuit of FIG. 2 will now be described. With the turn signal handle 34 in the "off" position as shown in FIG. 2 and with the ignition switch 22a in the "closed" or "on" position, the flasher 23a will be connected to the positive terminal of the battery 10a by means of the lead wires 18a, 19a, the switch 22a, the terminal 78, and the lead wire 20a. The other side of the flasher 23a is connected by means of the lead wire 21a, the terminal 46, the lead wire 45, the normally closed relay contacts R–1, the lead wire 44, the terminal 43, and the lead wires 41 and 42, to the turn signal lamp contact terminals 39 and 40. It will be seen that the circuit divides at the terminal 43 and terminates at the terminals 39 and 40, and hence no flashing occurs at the left and and right turn signal lamps 13a and 16a which are on the front of the car and which are thus inoperative. Referring back to the terminal 46, under the same assumed condition, the circuit from the flasher 23a divides or splits and goes through the normally closed relay contact R–2 and the lead wires 66 and 67 to the terminal 68. From the terminal 68, the circuit ends at the open relay contact R–3 and the switch terminals 62 and 63, and since these last mentioned terminals are not contacted by the switch elements 30 and 31, there will be no flashing of the left or right stop lights 14a and 15a.

The time delay circuit may be followed under the same assumed condition by starting at the terminal 78. With the switch 22a in the "on" position there will be no flow of current through the heater element 72 because the circuit therethrough ends at the open terminals 85 and 86. The circuit from the terminal 78 extends through the lead wire 77, the terminal 76, the heater element 72, the lead wire 79, the terminal 80, the lead wire 81, the terminal 82, and thence through the parallel lead wires 83 and 84.

Under the assumed inoperative condition of the turn signal system the stop lights 14a and 15a would be operative by means of the following circuit. The stop switch 24a would be closed and such action would complete a circuit from the positive side of the battery 10a through the lead wires 18a, 26a and 25a, to the lead wire 27a, and terminal 61. At the terminal 61, the circuit divides and one end terminates at the normally open contact R–3, and the other end continues to terminal 59. From the terminal 59 the circuit splits into two portions, one portion of which is connected by the lead wire 57 to the terminal 55 which is shorted by the switch element 30 to the terminal 50. The terminal 50 is connected by the lead wire 51 to the terminal 49, and this terminal is connected by the lead wire 47 to the left stop light 14a to ground 12a and back to the grounded terminal of the battery source 10a. This completed circuit through the left stop light 14a causes it to glow. The other portion of this split circuit continues from the terminal 59 through the lead wire 58, the contact terminal 56, the switch elements 31, the contact terminal 53, the lead wire 54, the contact terminal 52, and the lead wire 48 to the right stoplight 15a, and thence to ground 12a in order to cause this light to glow.

Figures 3, 4:
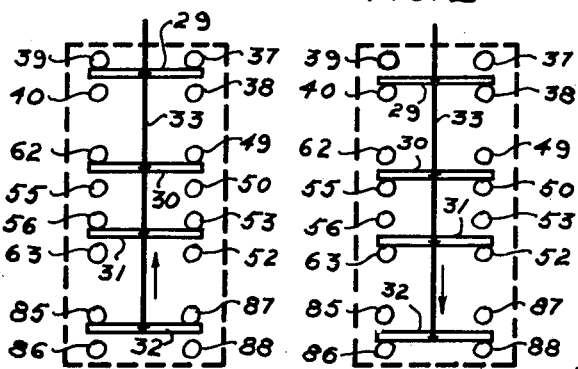
FIG. 3 shows the manually operated selector switch of the structure shown in FIG. 2 being moved to the position for indicating a left turn; and, FIG. 4 shows the selector switch structure of FIG. 2 moved to indicate a right turn.

The description of the circuitry for a left turn will now be given. The turn signal handle 34 would be moved to the left position and the switch bar 33 would be moved to the position shown in FIG. 3. The flasher circuit may be traced by starting at the positive terminal of the battery 10a and then proceeding through the lead wire 18a, the lead wire 19a, the ignition switch 22a, the terminal 78, and the lead wire 20a to the flasher 23a. The outlet side of the flasher 23a is connected by means of the lead wire 21a to the terminal 46. From the terminal 46 the flasher circuit continues through the lead wire 45, the normally closed contact R–1, and the lead wire 44 to the terminal 43 where it divides and one portion continues through the lead wire 42 where it terminates at the terminal 40. The other portion continues through the lead wire 41 to terminal 39 which is shorted to terminal 37 by the switch element 29. This other portion continues through the lead wire 35 and the left front turn light 13a to ground 12a and then back to the grounded terminal of the battery 10a. This completed circuit causes the left turn light 13a to blink "off" and "on" as the flasher unit 23a functions.

Going back to terminal 46, the other branch of the flasher circuit may be followed through the normally closed relay contact R–2 to the terminal 68. From the terminal 68 the circuit divides and one end terminates at the normally open contact R–3 and the other end continues to switch terminal 62. From the contact terminal 62, the circuit divides and one end terminates at the switch contact terminal 63 and the other end continues to the shorted contact terminal 49 by switch element 30. From the contact terminal 49 the circuit divides and one end terminates at the terminal contact 50 and the other end continues through the left stop light 14a to ground 12a and back to the grounded terminal of the battery 10a. This completed circuit causes the left rear stop light to blink "off" and "on" simultaneously with the left front turn light.

In order to follow the time delay circuit under this condition the terminal 78 will be used as a starting point. From terminal 78, this time delay circuit extends through the lead wire 77 to the terminal 76 and thence through the heater element 72 of the time delay means 71, and to the terminal 80. The circuits at the terminals 76 and 80 divide and end at the normally open relay contacts R–4 and the contacts 74 and 75 of the time delay means 71. From the terminal 80 the circuit continues to terminal 82 where the circuit divides and one end terminates at switch contact terminal 86 and the other end continues to switch contact terminal 85 and then to the shorted terminal 87 through the switch element 32. From the terminal 87 the circuit extends to the terminal 91 where the circuit divides and one end terminates at terminal 88 and the other end continues through the coil of relay R to ground 12a and back to the ground terminal of the battery 10a.

Under these conditions there is established a completed circuit through the series circuit consisting of the heater element 72 of the time delay means 71, and the coil of the relay R. However, as set forth hereinbefore, the series circuit allows insufficient voltage drop across the coil of relay R but it does allow the heater element 72 of the time delay means 71 to begin to get hot. The $I^2R$ heat produced by this heater element and the characteristics of the bi-metal strip 73 inside the time delay 71 are so calibrated that the contacts 74 and 75 close after approximately three minutes heat-up time. When the contacts 74 and 75 in the time delay means 71 close, they short out the heater element 72 and in turn cause a shorted condition between terminals 76 and 80. This shorted condition between terminals 76 and 80 reduces the voltage drop across the time delay 71 to zero so that full battery voltage is applied to the coil of relay R between terminal 91 and ground 12a. With full voltage across the coil of relay R, this relay operates and almost simultaneously opens normally closed contacts R–1 and R–2, and closes normally open contacts R–3 and R–4. Accordingly, for all practical purposes the contacts 74 and 75 of the time delay means 71 and the contact R–4 closes at the same time. This operation causes the following action to occur. When the contacts 74 and 75 of the time delay means 71 close, current no longer flows through the heater element 72 so that it begins to cool, the bi-metal strip 73 bends and opens its contacts 74 and 75. However, with relay contact R–4 closed at the same time, the shorted condition between terminals 76 and 80 is maintained so that full battery voltage is maintained across the coil of relay R even though the contacts 74 and 75 of the time delay 71 are open.

Returning to the flasher circuit at terminal 46, it will be seen that the circuits from the terminal 46 to the terminals 43 and 68 are dead because the relay contacts R–1 and R–2 are open. Hence, the flasher circuit is no longer operative and the left turn and stop lights no longer blink and are not glowing.

Under these conditions the stop light circuit will still be operative. Assuming the stop switch 24a is closed and current is flowing to terminal 61, this circuit splits and goes through the closed contact R–3 and to terminal 68, and also to terminal 59. At terminal 68 the circuit divides again and one end terminates at the open contact R–2 and the other end continues to switch terminal 62. At terminal 62 the circuit divides and one end terminates at terminal 63 and the other end continues to shorted terminal 49 by switch element 30. From terminal 49, the circuit divides and one end terminates at terminal 50 and the other end continues through the left stop light 14a to ground and then back to the ground terminal of the battery. It will be seen that there will thus be a circuit completed through the left stop light 14a so that it glows. Going back to terminal 59, this circuit divides and one end terminates at switch terminal 55 and the other end continues to switch terminal 56 which is shorted to switch terminal 53 by switch element 31. From terminal 53 the circuit continues to terminal 52 and through the right stop light 15a, to ground and back to the ground terminal of the battery 10a.

It will be seen that there is a completed circuit through this right rear stop light 15a and that both the rear stop lights will operate. The stop lights 14a and 15a will glow even though the turn signal handle 34 and the switch bar 33 is in the left position and the turn signal light has been interrupted by the time delay device 71. The operation of the flasher circuit, the time delay circuit, and the stop light circuits with the turn signal handle 34 disposed in the right turn position are essentially the same as just described for the left turn position except that the switch elements are in the position shown in FIG. 4.

The aforedescribed circuitry gives the left signal lamps 13a and 14a their normal flashing action for a predetermined time interval after which time the front and rear left turn signal lamps are turned off. The same condition occurs when the turn signal device is used for a right turn. This is the primary function of the device of the present invention. A turn signal apparatus alerts other drivers to an indicated left or right turn. However, in some instances the means for returning the signal handle back to the inoperative position does not function, thereby causing undue and unnecessary annoyance to other drivers following behind. After the timed controlled device of the present invention turns the signal lights automatically off, it is merely necessary to move the turn signal handle 34 to the neutral position and then to the left or right turn position in order to again signal a driver's intention to turn.

The device controlled timed turn signalling apparatus of the present invention in no way affects the normal operation of the lighting or electrical system of a vehicle or the normal operation of the usual turn signal system. Likewise, no possible combination of switching arrangements with the ignition key, turn signal selector lever, and the signalling apparatus can damage any of the components of the vehicle or the signalling apparatus itself. It will be understood, that the normal operation of the turn signal circuit is not interrupted until such time as the time delay means 71 operates, causing the relay to function, and thereby interrupting the flashing turn signal circuit.

In the use of the device of the present invention, assume a left turn is required. The turn signal handle 34 is placed in the left turn position and the left turn signal lights 13a and 14a, both front and rear, start blinking. Normally, after the turn is completed the steering wheel returns the turn indicator handle 34 to the neutral position and the turn lights go off. With the present device, every time the turn signal handle 34 is placed in either the right or left position the turn signal lights start blinking and the time delay means 71 is energized. However, the time delay device 71 only causes interruption after a predetermined time when: the turn is not completed; the arc of the turn is not great enough to engage the mechanism for normally returning the lever 34 to the neutral position; the mechanism for returning the lever 34 to neutral is defective; if the turn indicator lever 34 is placed in left or right position without the operator's knowledge; and, any other reason that places the lever 34 in a turn position or causes turn lights to blink.

The device of the present invention has an added safety feature in that both of the stop lights 14a and 15a will function in their normal manner after the time delay device 71 stops the blinking of the turn signal lights, even though the turn signal handle 34 and switch lever or bar 33 are not in neutral or "off" position.

Although the timed interruption device is illustrated as a separate device or wired circuit, it will be understood that the turn signal circuits already installed in vehicles could be modified to include additional components in order to convert them to a system embodying the present invention. An important result of the instant device is that it will eliminate unnecessary and distracting blinking of turn signal lights. If the device times out and the driver forgets to move the signal handle back to the neutral position before the next time that it is needed the driver may use the signal light when next needed by merely putting the signal handle in the neutral position and then moving it to the left or right turn position, as desired.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What I claim is:

1. A vehicle timed turn signalling apparatus comprising: a first pair of lights adapted to be mounted on one side of a vehicle in a longitudinally spaced apart arrangement; a second pair of lights adapted to be mounted on the other side of a vehicle in a longitudinally spaced apart arrangement; a direct current source; a flasher unit electrically interconnected between said direct current source and said first and second pairs of lights; a directional turn switch having contact means interconnected between said flasher unit and said first and second pairs of lights for selective alternate connecting of said pairs of lights to the flasher unit; said flasher unit being adapted to periodically break the current flow to a pair of said pairs of lights when connected thereto by said directional turn switch; a relay switch means; and, additional contacts operated by said directional control turn switch, a time delay device interconnected between said direct current source, said additional contacts and said relay switch means energizing the relay switch means to disconnect said flasher unit from said directional turn switch after a predetermined time interval when the directional turn switch is in a position for connecting one of said pairs of lights to the flasher unit.

2. A vehicle timed turn signalling apparatus comprising: a first pair of lights adapted to be mounted on one side of a vehicle in a longitudinally spaced apart arrangement; a second pair of lights adapted to be mounted on the other side of a vehicle in a longitudinally spaced apart arrangement; a direct current source; a flasher unit electrically interconnected between said direct current source and said first and second pairs of lights; a directional turn switch having contact means interconnected between said flasher unit and said first and second pairs of lights for selective alternate connecting of said pairs of lights to the flasher unit; said flasher unit being adapted to periodically break the current flow to a pair of said pairs of lights when connected thereto by said directional turn switch; a relay switch means; a time delay device interconnected between said direct current source and said relay switch means for energizing the relay switch means to disconnect said flasher unit from said directional turn switch after a predetermined time interval when the directional turn switch is in a position for connecting one of said pairs of lights to the flasher unit; and, said relay switch means including, a pair of normally closed contacts for normally connecting the flasher unit and the directional turn swtich, and a normally open contact connected in parallel with said time delay device.

3. The signalling apparatus as set forth in claim 2, wherein: one light in each of said pairs of lights comprises a vehicle stop light; said stop lights are connected through said directional turn switch and a separate circuit to said direct current source for separate use as stop lights; and, said relay switch means further including a normally open contact adapted to complete said separate circuit through the stop light connected to the flasher unit when it is disconnected from the directional turn switch.

References Cited in the file of this patent
UNITED STATES PATENTS

| | | |
|---|---|---|
| 2,040,923 | Doane | May 19, 1936 |
| 2,172,068 | Murray | Sept. 5, 1939 |
| 2,704,360 | Werstein | Mar. 15, 1955 |
| 2,831,176 | Liberto | Apr. 15, 1958 |
| 2,845,608 | Short | July 29, 1958 |